July 21, 1936.    L. PAVIA    2,048,619
QUILL
Filed Feb. 29, 1936
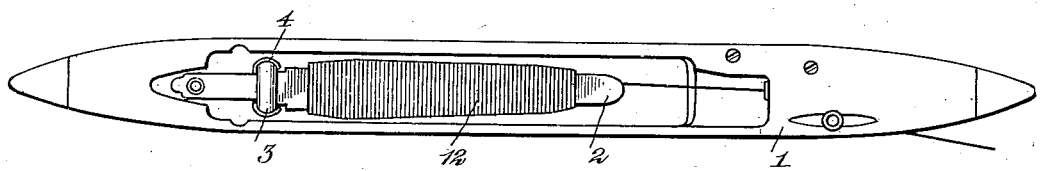
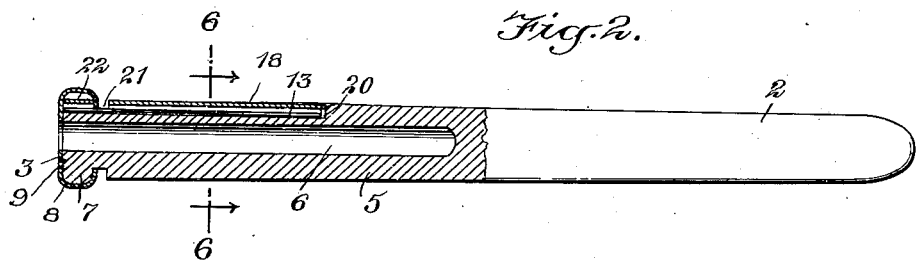
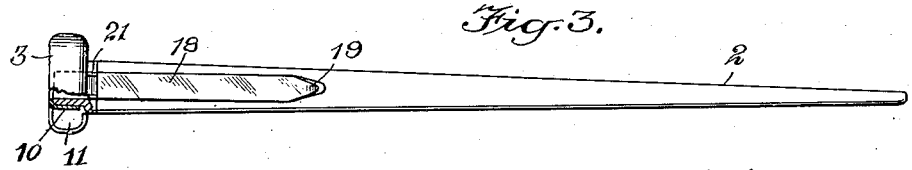
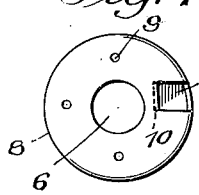
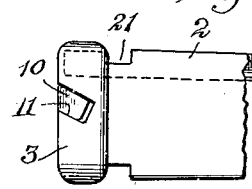
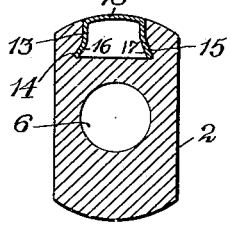
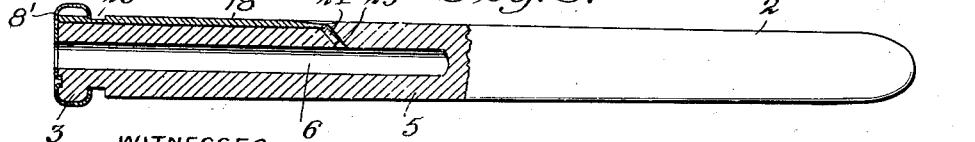
WITNESSES
INVENTOR
Luigi Pavia
BY
ATTORNEYS Patented July 21, 1936

2,048,619

UNITED STATES PATENT OFFICE 2,048,619

QUILL

Luigi Pavia, Allentown, Pa.

Application February 29, 1936, Serial No. 66,371

8 Claims. (Cl. 139—289)

This invention relates to quills for shuttles used in looms, the nature of the invention being such that a good metallic connector is utilized in a quill, and so formed as to be readily applied and wear a long time.

An object of the invention is to provide an improved quill structure wherein the metal short-circuiting member is bodily inserted into the quill rather than applied thereto by spraying.

Another object of the invention is to provide an improved quill wherein the parts are so formed that the short-circuiting contact member may be readily slid into place and then locked by the head of the quill.

A further object is to provide in a quill an arrangement whereby the short-circuiting contact member may be anchored at both ends.

In the accompanying drawing—

Figure 1 is a plan view of a shuttle with a quill embodying the invention applied thereto, the quill being shown partly filled with yarn;

Fig. 2 is a view showing a quill embodying the invention partly in elevation and partly in section, the section illustrating a certain portion of the short-circuiting contact member;

Fig. 3 is an edge view of the structure shown in Fig. 2, part of the head being shown broken away;

Fig. 4 is an end view of the structure shown in Fig. 2;

Fig. 5 is a plan view in elevation of the left-hand end portion of the quill shown in Fig. 1, the same being on a slightly enlarged scale;

Fig. 6 is a sectional view through Fig. 2, approximately on the line 6—6, the same being on an enlarged scale;

Fig. 7 is an enlarged perspective view of the short-circuit contact shown in Fig. 2;

Fig. 8 is a view similar to Fig. 2, but showing a modified form of short-circuiting contact;

Fig. 9 is a perspective view on an enlarged scale of the contact shown in Fig. 8.

Referring to the accompanying drawing by numerals, 1 indicates a shuttle of any desired or preferred kind, and 2 a quill provided with a head 3 adapted to be received by the usual jaws 4 so that the quill may be swung into or out of the shuttle as desired.

As illustrated particularly in Figs. 2 and 3, the quill 1 is provided with flat edges and flat top and bottom surfaces, with the meeting corners rounded more or less as illustrated in Fig. 6. Preferably the quill 1 tapers from the head 3 to the opposite end, as shown in Fig. 3, but preferably is of the same width throughout when looking at the same as illustrated in Fig. 2. As shown in the drawing, the quill 1 is provided with a body 5, which may be of wood composition or any desired material but preferably is of wood on account of cheapness and lightness. The usual bore 6 is also provided and an enlargement 7 formed at the left-hand end as shown in Fig. 2. A metal cap or covering 8 surrounds the enlargement 7 and with the enlargement forms the head 3. The metal covering 8 is preferably provided with a number of punched-in portions 9 which present spurs as illustrated in Fig. 2. In addition, part of the covering 8 is cut at spaced points and the material 18 between said points is pressed downwardly forming a notch 11. This notch is adapted to receive a pin carried by a shuttle so as to indicate to the operator whether the yarn 12 is a right or left winding.

The body 5 is provided with a notched or grooved portion 13 having undercuts 14 and 15 for receiving the flaring edges 16 and 17 of the contact or short-circuiting plate 18. This forms a dove-tail arrangement with the parts formed to fit snugly so that when the contact 18 is slid into position from the left, as shown in Fig. 1, the friction will act to prevent any accidental movement. However, the parts are preferably so proportioned that the end 19 of the contact 18 is adapted to rest against the end 20 of the grooved portion 13. A notch 21 is formed in the contact 18 and the covering 8 of the head 3 is forced into this notch so that a short section 22 of the top of contact 18 will fit snugly within the covering 8, as shown in Fig. 3. This alone will prevent any accidental movement of the contact 18.

In case for any reason it should be desirable or necessary to remove the contact 18, it will be necessary to remove the cover and then contact 18 may be slid out of its position.

It will be understood that in quills for shuttles, metal contacts are provided which coact with the stop motion of the loom and cause the same to function when the yarn 12 becomes exhausted. In the present invention this broad idea of providing some kind of metal contact is not claimed as new but the particular structure and arrangement of the contact is believed to be new in itself and in connection with the head 3 and the body 5.

As shown in Figs. 8 and 9 a contact of a modified structure may be utilized with the body 5 and the head 3. Referring to these two figures, it will be observed that the contact 18' is a solid bar and at one end is provided with a notch 23 and at the other end with a projecting spur 24. The notch 23 functions in a similar way to the notch

21, while the spur 24 is adapted to be driven directly into the body 5 by a hammer or by being pressed therein, or, if desired, an aperture 25 could be formed and the extension slid therein after which the covering member 8' could be applied as shown in Fig. 8. In this form of the invention there is no dovetail groove but only a longitudinally extending notch of a size to fit almost exactly the contact 18'. It will be understood that the contact 18' could be made of any desired thickness and also the contact 18, so that they will wear for an indefinite length of time and, in fact, will usually wear as long as the quill is usable.

I claim:

1. A quill for shuttles formed with a tapering body of wood having a head at one end integral with the body, an annular groove adjacent said head, and a notch extending from said groove longitudinally of the body for part of the length thereof and a sheet metal short-circuiting contact member positioned in said groove and rigidly secured to said body.

2. A quill formed of wood provided with a bore extending from one end toward the other, a tapering body merging into a head at one end and a restricted neck adjacent said head, said body being provided with a longitudinally extending notch, and a rigid sheet metal contact member substantially filling said notch and extending from said head a short distance toward the opposite end of the body, said sheet metal member being positioned with its upper surface flush with the surface of said body.

3. A quill for shuttles, comprising a body of wood having an enlarged head, said body and head being provided with alined grooves, a metal contact member substantially filling said grooves, said metal contact member having a notch, and a sheet metal covering for said head formed with a turned-over edge having a portion fitting into said notch for locking said metal contact against movement.

4. A quill for shuttles, comprising a body having a longitudinally extending bore for part of its length, said body being formed with a head at one end, a longitudinally extending notch merging at one end into an aperture extending into said bore, and a restricted neck adjacent said head, and a metal member extending longitudinally of said body and provided with an extension projecting into said head and interlocking with part of the head, said metal member being also provided with a spur snugly fitting into said aperture for holding the metal member against independent movement.

5. A quill for shuttles, comprising a body having a dove-tail groove extending from one end of the body toward the opposite end, and a metal contact member having a contact portion and flared edges, the contact member fitting snugly into said dove-tail groove with the flared edges inerlocking with part of the body adjacent the groove and a head forming means for preventing said contact member from moving longitudinally in said groove.

6. A quill, comprising a body of wood, a groove extending longitudinally of the body and formed with undercuts, a contact member having a contact portion and flared edges, said contact member fitting said groove with the flared edges interlocking with the undercut parts of the body, said body being formed with a head having a sheet metal covering provided with a diagonally positioned notch in the periphery and with means interlocking with part of said contact member for preventing longitudinal movement of the contact member.

7. A quill and contact member cooperating therewith, said quill including a body having a groove extending from one end toward the other and provided with undercut portions adjacent the bottom, said contact member having an elongated body substantially rectangular in section with flared edges, said body being hollow, and the parts being of a size to snugly fit in said groove with the flared edges fitting against the walls of said undercut portions.

8. A quill, comprising a body of non-conducting material formed with a head, a metal covering for said head, the body having a longitudinally positioned groove, and a metal contact plate fitting into said groove formed at one end with a spur projecting into said body and at the other end with means interlocking with said metal covering.

LUIGI PAVIA.